(12) United States Patent
Marino et al.

(10) Patent No.: US 6,202,367 B1
(45) Date of Patent: Mar. 20, 2001

(54) RAISED BORDER SYSTEM

(75) Inventors: Jeffrey R. Marino, Fishkill; Anthony G. Topping, Carmel, both of NY (US)

(73) Assignee: Vegherb, LLC, Carmel, NY (US)

( * ) Notice: Subject to any disclaimer, the term of this patent is extended or adjusted under 35 U.S.C. 154(b) by 0 days.

(21) Appl. No.: 09/231,099

(22) Filed: Jan. 14, 1999

(51) Int. Cl.$^7$ .................................................. E04B 2/76
(52) U.S. Cl. .................................. 52/102; 47/30; 47/33
(58) Field of Search .................................. 52/102; 47/30, 47/33

(56) References Cited

U.S. PATENT DOCUMENTS

| | | | |
|---|---|---|---|
| 3,537,687 | * 11/1970 | Adelman .................................. | 47/33 |
| 4,869,018 | * 9/1989 | Scales et al. .............................. | 47/33 |
| 5,230,187 | 7/1993 | Reimann . | |
| 5,291,708 | * 3/1994 | Johnson .................................. | 47/33 X |
| 5,809,700 | * 9/1998 | Roush et al. ......................... | 52/102 X |
| 5,852,895 | * 12/1998 | Sinanan .................................... | 47/33 |
| 5,901,526 | * 5/1999 | Vidmar et al. ......................... | 47/33 X |
| 6,085,458 | * 7/2000 | Gau .................................... | 52/102 X |

OTHER PUBLICATIONS

E–Z Border Garden Date (unknown).
* cited by examiner

*Primary Examiner*—Beth A. Stephan
*Assistant Examiner*—Brian E. Glessner
(74) *Attorney, Agent, or Firm*—Lilling & Lilling P.C.

(57) ABSTRACT

A support bracket and stake are provided which can be used for edging gardens and lawns or for the formation of retaining walls. Used together, the bracket and stake provide a means to support and anchor lengths of lumber to the ground to create a variety of edging systems. In particular, the stakes provide a means to attach the system securely to the ground surface, while the support bracket has a beam receiving portion to support a variety of different types of lumber frequently used in edging. A mounting column on the support bracket provides a means to secure the support bracket to the stakes such that the support bracket may freely rotate 360° perpendicular to the vertical axis of the stake. The stakes may be vertically engaged one upon and inside the other to provide a raised border system of various height. Where it is desired to vertically engage the stakes, more than one bracket may be secured to the vertical stakes, one bracket on top of the other, so as to support and anchor lengths of lumber, one on top of the other, to form a wall of any desired height.

14 Claims, 3 Drawing Sheets

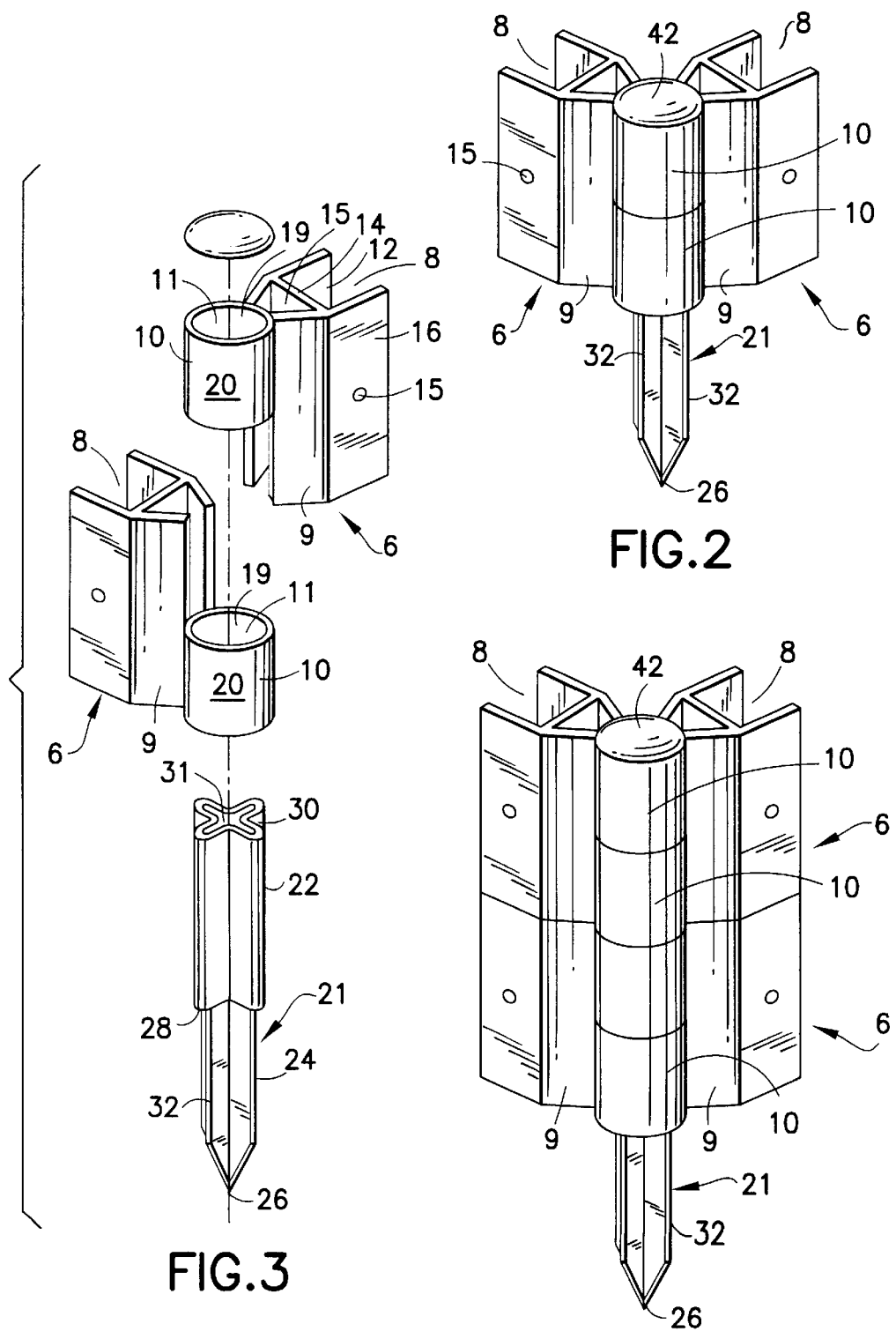

RAISED BORDER SYSTEM

FIELD OF THE INVENTION

This invention relates to the home gardening and landscape industry, and, in particular, a support device for constructing raised borders or beds suitable for use as landscape edging.

BACKGROUND OF THE INVENTION

Timber is used for building borders or walls on the ground to form edging for lawns and gardens. Generally, such edging systems comprise wooden members and means for anchoring the wooden members on the ground. However, current devices in the market do not provide a versatile raised border system which may be used in one instance as a simple raised garden border, or in another instance to form a raised terrace bed or retaining wall of varying height.

One difficulty found with many of the current devices in the market is that they may only provide single level edging. That is, only a single beam of various width may be used to form a raised bed or edge. As a result, separate and more costly support means must be employed for the construction of multilevel stepped beds, terrace beds or support walls.

Frequently, consumers in the home gardening industry will use railroad ties to form landscape edges. However, the general problem with railroad ties is that they are costly, burdensome and once in place become difficult to remove. Further, due to the large weight and size of railroad ties, stacking them to create retaining walls may require excessive labor, involving one or more parties and, as a result, be impractical. In addition, a separate means must be applied to anchor the railroad ties both to the ground and to one another.

Some edging devices do not provide the versatility often needed in landscaping due to the fact that they are limited to forming edging only at right angles or of limited shape and size. For example, a user may desire to encircle a large area or create a variety of shapes such as a semi-circle, octagon, triangle, trapezoid or parallelogram. As a result, these devices limit the user's creativity.

In addition, some edging devices, once in use, do not create an aesthetically pleasing appearance. When these devices are used to create borders, they may look awkward or incompatible with their natural surroundings, thereby taking away from the pleasing appearance of the garden bed. Therefore, there is a need in the home gardening industry for an aesthetically pleasing, yet versatile, landscape border system for anchoring lengths of timber to the ground.

One such edging device is Reimann (U.S. Pat. No. 5,230,187). Reimann discloses a stake which may be used for edging gardens and lawns or for the formation of forms for concrete foundations and slabs. The stake is made from a rigid plastic material and contains a tapered end 12 for penetrating the ground and a trailing end 14 for receiving a beam of lumber.

In contrast, the present invention has at least one support bracket which may be mounted upon a stake of various shape and size. The support bracket and stake are separate elements of the invention, thereby increasing versatility. In this regard, the bracket comprises a beam receiving portion for receiving and fastening to any standard size strip of lumber and means to secure the bracket to the stake. Further, the current invention provides the ability to rotate the brackets, such that they may form an angle from 60° to 300°, while remaining upon an equal horizontal plane and perpendicular to the vertical axis of the stake. In addition, Reimann does not disclose securing more than one bracket to a single stake or vertically engaging a plurality of stakes to allow a plurality of freely movable support brackets to be vertically aligned and secured to said stakes.

Another known device for the building of landscape edging is the E-Z BORDER™ system. E-Z BORDER™ discloses stakes to be used in conjunction with brackets to form raised garden beds. The brackets, which receive various lengths and sizes of lumber, are fastened to the stake using a dowel and socket means. However, E-Z BORDER™ does not disclose stakes which may be vertically engaged one on top and inside of the other, so as to form raised bed gardens of various heights, while remaining upon an equal horizontal plane and perpendicular to the vertical axis of the stake. Further, E-Z BORDER™ uses a different method of securing the brackets upon the stakes distinct from the method utilized by the current invention. Whereas in E-Z BORDER™, the user must specifically use the unique stakes provided together with the bracket, in the current invention, many types and styles of stakes may be used due to the versatile securing means of the support brackets.

Therefore, there is a need in the industry for a durable, yet adjustable raised border system that enables the user to use timber to form edging in a simple, easy to use fashion, while still providing the versatility to incorporate such device in numerous outdoor projects. Further, there is a need for a raised border system which may be used in one instance as a simple raised garden border, or in the alternative to form a raised terrace bed or retaining wall of varying height.

SUMMARY OF THE INVENTION

It is the object of this invention to provide a raised border system which allows the user to create landscape edging of various heights, while at the same time being durable, lightweight and weather resistant. Furthermore, it is the object of this invention to create a simple, versatile raised border system which is aesthetically pleasing and easy to use. In addition, the present invention provides a raised border system which may be used to construct walls of various height along with stepped and/or terraced garden beds.

The invention comprises at least two support brackets used in conjunction with stakes and ordinary lumber to provide a support framework.

One unit of the raised border system comprises one stake and two support brackets. The stakes are designed such that two or more stakes may be vertically engaged by inserting one stake above and inside an identical stake to form a continuous top support member of various height to secure one or more support brackets. In turn, such support brackets may be vertically aligned one on top of the other, on the vertically engaged stakes. Any number of units may be used to create a variety of landscape edging formations of various sizes and shapes depending on the desired needs of the user. Further, units employed in a vertical fashion may be used to create edging or retaining walls of various heights.

The support brackets comprise a beam receiving portion connected to a mounting column. The beam receiving portion forms a channel so as to receive a beam of lumber therebetween. A spacer is located between the beam receiving portion and the mounting column, thereby connecting the beam receiving portion to the mounting column. The stake comprises a top support member resting above the body and tapered tip for penetrating the ground. The user drives the stakes into the ground at the desired position.

Once the stakes are anchored to the ground, the support brackets are fastened to the stakes by placing the mounting column of the support bracket on and over the tip support member. The mounting column is of such size and shape so as to tightly slide over the top support member of the stake, thereby fastening the support bracket to the stake. Furthermore, the height of the mounting column is equal to one half the height of the support bracket so that, when two brackets are secured to one stake, the two mounting columns of both brackets are equal in height to the top support member of the stake and together are equal to the height of the support brackets.

The top support member of the stakes have a hollow interior such that the bottom portion of one stake may be inserted into the hollow interior of the top portion of another identical stake so as to vertically engage the stakes one on top of and inside the other to form a continuous top support member. In turn, more than one bracket may be secured to the stakes such that one support bracket is in vertical alignment with the other so as to support and anchor lengths of lumber one on top of the other. In this way, the raised border system may be used to form a border or retaining wall(s) of any desired height. In addition, vertical alignment of the raised border system may be used to create terraced steps or beds.

Other objects, features and advantages of the invention shall become apparent as the description thereof proceeds when considered in connection with the accompanying illustrative drawings.

BRIEF DESCRIPTION OF THE DRAWINGS

FIG. 2 is a perspective view of the stake and support bracket of the invention.

FIG. 3 is an exploded view of the stake and support brackets.

FIG. 5 is a perspective view of multiple stakes with corresponding brackets.

DETAILED DESCRIPTION OF THE INVENTION

Figure 1:
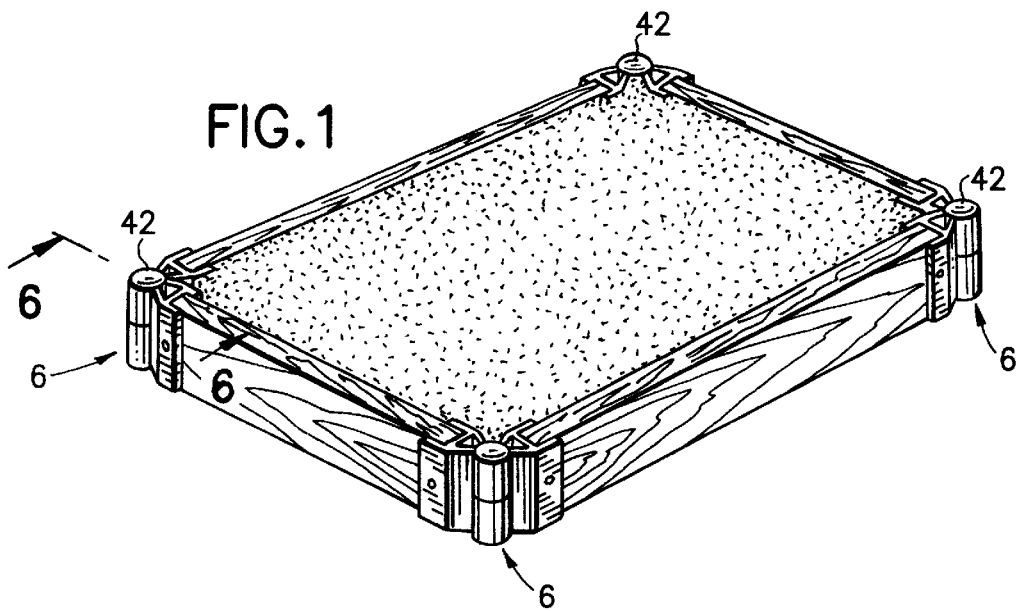
FIG. 1 is a perspective view of the raised border system of this invention.
Figure 6:
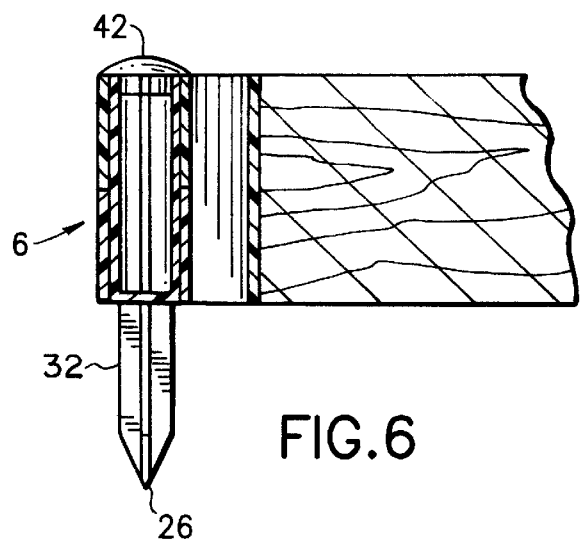
FIG. 6 is a cross section along line 6—6 of FIG. 1.

In is simplest embodiment, the invention consists of at least one support bracket secured to a stake which can be used for edging gardens and lawns, play areas, ponds or for the formation of retaining walls. Used together, the support bracket and stake provide a means to support and anchor lengths of lumber to the ground to create a variety of edging systems. In particular, the stake provides a means to attach the system securely to the ground surface, while the support bracket has a beam receiving portion to support a variety of different types of lumber frequently used in landscape edging. The stakes may be vertically engaged one upon and inside the other, while secured to the ground surface, so, when used in conjunction with the support brackets, a raised border system of various height is provided. The support bracket is secured to the stake in a manner such that said bracket may freely rotate 360° perpendicular to the vertical axis of the stake, while still effectively supporting lengths of lumber.

Preferably, two support brackets are mounted upon a top support member of a single stake, thereby forming one unit of the raised border system. In this way, the two brackets may form a corner for supporting two lengths of lumber upon an even plane with the ground and perpendicular to the vertical axis of the stake such that the brackets form any angle ranging from 60° to 300°. Where it is desired to vertically engage the stakes, more than one bracket may be secured to the vertical stakes, one bracket on top of the other, so as to support and anchor lengths of lumber, one on top of the other, to form a border or retaining wall of desired height.

In the preferred embodiment, the support bracket 6 comprises a beam receiving portion 8, a spacer 9 and a mounting column 10. The mounting column 10 is O-shaped with a channel 11, which defines an inside surface 19 and outside surface 20. The beam receiving portion 8 is U-shaped and has a rear rim 12, a front rim 16 and a base 14, which define a channel for receiving beams of lumber. The mounting column is fastened along its outside surface 20 to the spacer 9, which in turn, is fastened to the rear edge 15 of the base 14. When connected, the longitudinal axis of the channel 11 of the mounting column is parallel to the longitudinal axis of the channel defined by the beam receiving portion 8. It is desirable, but not mandatory, that the height of the mounting column 10 be one half of the height of the beam receiving portion 8. In some embodiments, the spacer may be eliminated and the mounting column may be fastened directly to the rear edge of the base.

Further, a hole 15 may be placed in both the rear rim and the front rim of the beam receiving portion 8. In this way, screws, nails or the like, may be placed through the holes and into the beam of lumber secured by the support bracket. As a result, the lumber may be more firmly fastened within the bracket, thereby increasing the stability and structure of the raised border system.

Preferably, the support bracket is made of a light rigid plastic, such as acrylonitrile-butadiene-styrene copolymer, polyethylene, polyvinyl chloride, polycarbonate, polyproplene or styrene. It may, however, be made from any strong, sturdy and weather resistant material, such as aluminum, fiberglass or galvanized metal.

In the preferred embodiment, the stake 21 comprises a top support member 22, a body 24 and a tapered tip 26 for penetrating the ground. The top support member has an upper edge 30, a lower edge 28 and a hollow interior channel 31 defining an inside surface and an outside surface.

The body 24 of the stake may include fins 32 vertically aligned along the body. The fins 32 help to guide the stake, when driven into the ground, in a straight up-right position during insertion. In addition, once the stake is driven into the ground, the fins provide additional lateral support and prevent the stake from rocking or becoming loose over time.

In the preferred embodiment the top support member of the stake is X-shaped. In this way, the top support member consists of a larger surface area and, in turn, a greater amount of rigid plastic material. Therefore, greater force may be vertically applied to the stake while driving the stake into the ground without destroying the structural integrity or damaging the stake. In this regard, any number of shapes may be used, such as a circle, as long as the stakes may still be vertically engaged in an effective manner so as to form a continuous top support member upon which the mounting column of the support bracket may effectively be secured.

Preferably, the support bracket is made of a light rigid plastic, such as acrylonitrile-butadiene-styrene copolymer, polyethylene, polyvinyl chloride, polycarbonate, polyproplene or styrene. They may, however, be made from any strong, sturdy and weather resistant material, such as aluminum, fiberglass or galvanized metal.

The support bracket and stake are connected by inserting the top support member 22 of the stake into the channel 11 of the mounting column 10, so as to form a male/female connector, such that the top support member 22 acts as the male component and the mounting column 10 acts as the female component. Preferably, the outside surface of the top support member 22 is of such size so as to tightly engage the inside surface 19 of the mounting column 10. It is desirable, but not mandatory, that there be as little space as possible, so as to form a tight junction between the stake and support bracket. When connected, one support bracket may rotate 360° perpendicular to the vertical axis of the stake.

In the preferred embodiment, two identical support brackets are used in conjunction with a single stake to form a single unit of the raised border system. The height of the top support member 22 of the stake is twice the height of the mounting column 10 of each support bracket. In this way, one bracket may be placed on the top support member 22 standing upward such that the mounting column 10 encircles the lower half of the top support member 22. The other support bracket may be rotated 180° upside down such that, when placed on the top support member, the mounting column 10 encircles the top half of the top support member 10. In this way, both brackets are secured to a single stake while still being able to rotate perpendicular to the vertical axis of the stake. Further, the two mounting columns, one on top of the other, sit flush with the upper edge 30 of the top support member.

Where two identical brackets are placed upon a single stake, they may form an angle ranging from 60° to 300° perpendicular to the vertical axis of the stake while remaining on an equal horizontal plane with one another. As a result, a variety of different edging shapes may be created depending upon the needs and/or desires of the user.

In operation, the user sketches the design of the desired border to determine the number of stakes, support brackets and length of lumber needed to create the landscape edging preferred. The user then drives the stakes into the ground at the desired locations. Generally, the stakes will be located at a corner of varying angle. The support brackets are then secured to the stakes and rotated to the desired angles by placing the mounting columns 10 over the top support members of the stakes. Lengths of lumber are then cut to size such that the distal ends of each piece of lumber may be placed into the channel of the beam receiving portion of each support bracket. In this way, the raised border system anchors the lengths of lumber to the ground, thereby creating a bed or border system which may be filled with soil or the alike, depending on the needs of the user.

Due to the large range of angles available for creating a border system using the current invention, various shapes may be designed by the user such as a triangle, trapezoid, parallelogram, pentagon or octagon landscape edge. In addition, a semi-circle may be created leading away from a walkway or concrete patio surface.

The present invention may also be used to create retaining walls of various size and shape. The top support member 22 of each stake contains a hollow interior channel. The inside diameter of each identical stake is of such size and shape that the body 24 and tapered tip 29 of one stake may be completely inserted into the hollow interior channel of another identical stake so as to vertically engage at least two stakes. When two stakes are vertically engaged, the lower edge 28 of the top support member of the insertion stake rests flush with the upper edge 30 of the top support member of the receiving stake below. In this way, a continuous top support member is created for securing at least one support bracket. Any number of stakes may be vertically engaged to create a continuous support member of any desired height.

In operation, the user sketches the design and shape of the desired retaining wall or elevated landscape edging. Next, the user drives the stakes into the ground at the desired locations. Generally, the stakes are located at the ends or corners of the retaining wall or edging. Additional stakes are vertically engaged upon and inside the stakes originally driven into the ground to create a continuous top support member of the height desired by the user. The desired number of support brackets are then placed upon the continuous top support member of the vertically engaged stakes and rotated to the desired angles. More than one support bracket may be placed upon the other, thereby vertically aligning the beam receiving portion of said support brackets depending on the height desired. Cut lumber may be inserted within the beam receiving portion of the vertically aligned support brackets. In this way, lengths of lumber may be vertically placed one on top of the other in addition to being placed at varying angles. As a result, retaining walls may be created for soil support on a hill or sloped landscape.

The stakes may be vertically engaged at intermittent levels and secured to support brackets to create terrace beds in stairway fashion. Terrace beds may also be constructed by using vertically engaged stakes and support brackets in conjunction with a single stake and support brackets. In this way, raised bed gardens of various shapes and designs may be created.

Figure 7:
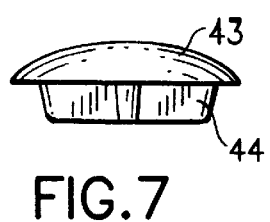
FIG. 7 is a side view of the cap.
Figure 8:
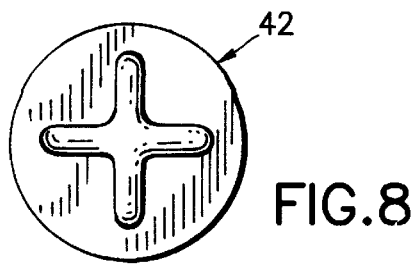
FIG. 8 is a top view of the cap.
Figure 4:
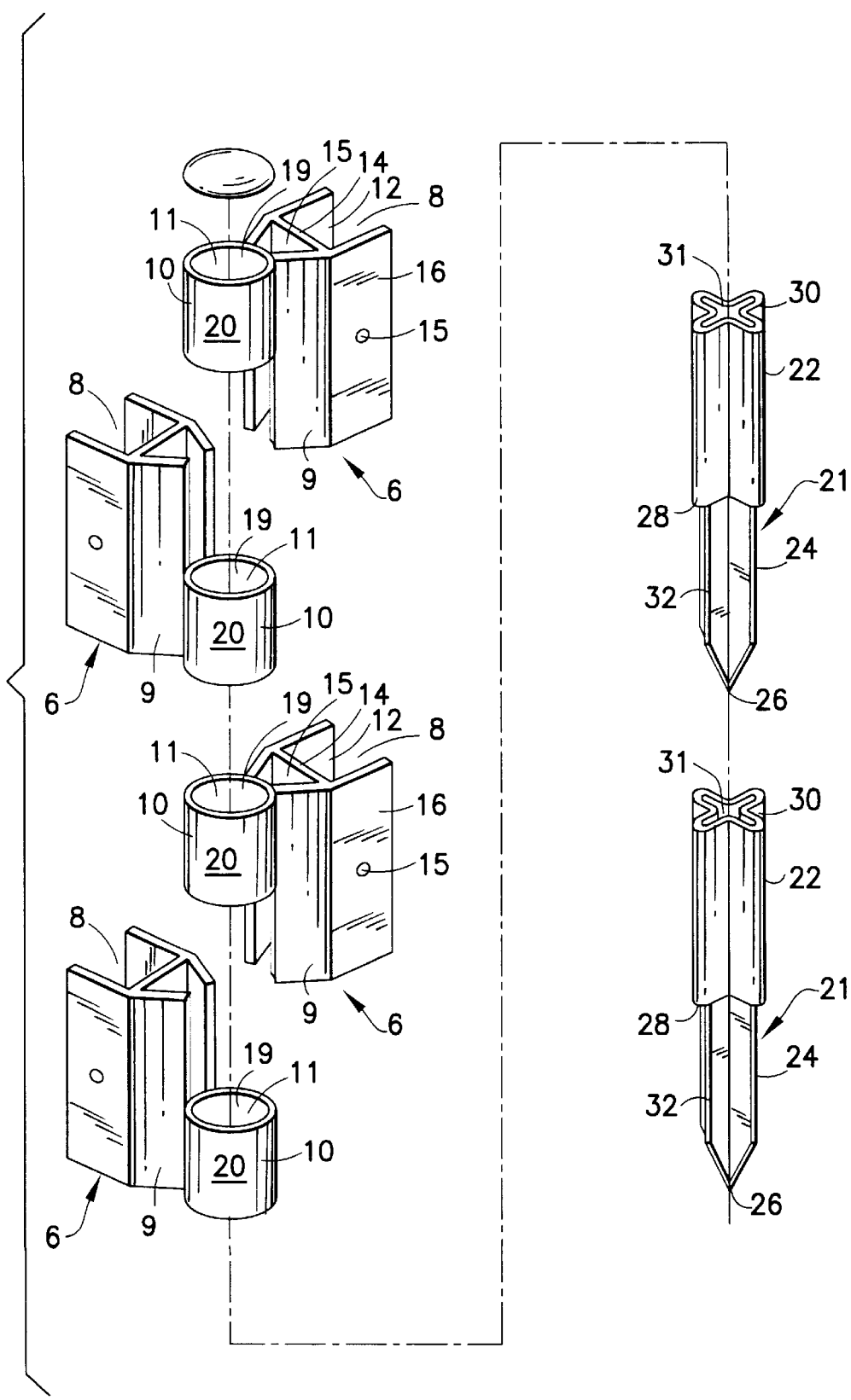
FIG. 4 is an exploded view of an alternate embodiment with multiple stakes and brackets.

A finishing cap 42 (FIGS. 7 and 8) may also be incorporated with the raised border system to provide a finished appearance to the landscape edging. In the preferred embodiment, the finishing cap 42 has a circular top 43 connected to a fastening means to secure the finishing cap to the raised border system. Preferably, the diameter of the circular top 43 is equal to the outside diameter of the mounting column so that the edges of the finishing cap and the mounting column are flush once the finishing cap is secured to the stake. In the preferred embodiment, the fastening means is a plug 44 fastened to the underside of the circular top 43. The size of the plug corresponds to the hollow interior of the top support member. In this way, the plug is inserted into the hollow interior of the top support member so as to form a male/female connector, such that the plug acts as the male component and the hollow interior acts as the female component. Preferably, the plug is of such size so as to tightly secure the finishing cap to the stake. However, any securing means may be incorporated which is sufficient to tightly secure the finishing cap to the upper edge of the top support member.

In use, the raised border system may be used to create a variety of garden or landscape edging of assorted shapes, sizes and designs. Such raised borders may be used to hold soil for the creation of a garden or flower bed. Alternatively, the retaining border may be used for a sandbox, play area, or rock garden.

In addition, the raised border system may be used to support raised pools of water or support walls for small man-made ponds. Such edging may also be used around the under portion of a raised deck or patio.

Alternative embodiments include raised border systems which incorporate support brackets having beam receiving portions of various sizes. In this way, the raised border system may support, utilize and anchor an assortment of timber sizes and lengths, including square, octagon, hexagon and other shapes.

Further, the user may drive one stake completely within the ground such that only the upper edge of the top support member is even with the ground surface. Another separate and identical stake may then be inserted into the top support member of the stake withing the ground to provide a top support member for mounting the support brackets. In this way, the depth of the stake securing the raised border system to the ground surface is in effect doubled. As a result, the raised border system is more securely anchored to the ground surface.

The invention is described in detail with reference to a particular embodiment, but it should be understood that various other modifications can be effected and still be within the spirit and scope of the invention.

What is claimed is:

1. A raised border system comprising:
    at least one support bracket comprising a beam receiving portion and a mounting column having a central channel; and
    at least one stake having a top support member, a body and a tapered tip for penetrating the ground, whereby said top support member inserts into the central channel of said mounting column to secure said support bracket to said stake, and wherein said top support member of said stake has a lower edge, an upper edge and a hollow interior, said hollow interior of said top support member being of such configuration that the body and tapered tip of a second identical stake may be inserted into said hollow interior of a first stake, such that the lower edge of the top support member of the second stake sits flush with the upper edge of the top support member of the first stake to vertically engage said stakes one upon and inside the other to form a continuous top support member.

2. A raised border system according to claim 1, wherein said beam receiving portion is U-shaped and is fastened to said mounting column, such that a longitudinal axis of said channel of said mounting column is parallel to a longitudinal axis of said beam receiving portion.

3. A raised border system according to claim 1 further comprising a spacer positioned between said beam receiving portion and said mounting column of said support bracket.

4. A raised border system according to claim 2, further comprising a spacer positioned between said beam receiving portion and said mounting column of said support bracket.

5. A raised border system according to claim 1, wherein said mounting column includes a tube defining said central channel.

6. A raised border system according to claim 1, wherein a plurality of support brackets are fastened upon said top support member of said stake.

7. A raised border system according to claim 1, wherein said support brackets rest one on top of the other.

8. A raised border system according to claim 1, wherein said beam receiving portions of said support brackets rest one on top of the other to form a continuous channel between said beam receiving portions.

9. A raised border system according to claim 1, wherein said support bracket can freely rotate 360° around the vertical axis of said stake.

10. A raised border system according to claim 1, wherein two identical support brackets may be movably mounted on a single stake, forming an angle relative to the beam receiving portion of each support bracket from 60° to 300° perpendicular to the vertical axis of the stake.

11. A raised border system according to claim 1, wherein the height of said mounting column is one half the height of said beam receiving portion.

12. A raised border system according to claim 1, wherein the beam receiving portion of said support bracket is equal in height to the top support member of said stake.

13. A raised border system according to claim 1, wherein a first support bracket may be placed upon said top support member standing upward such that the mounting column encircles a lower half of the top support member and a second support bracket is rotated 180° upside down such that when placed on said top support member, the mounting column encircles a top half of said top support member.

14. A raised border system according to claim 1, further comprising a finishing cap secured to said top support member of the stake.

* * * * *